United States Patent
Huang et al.

(10) Patent No.: US 8,176,245 B2
(45) Date of Patent: *May 8, 2012

(54) DYNAMIC DISK THROTTLING IN A WIDE AREA NETWORK OPTIMIZATION DEVICE

(75) Inventors: An-Cheng Huang, Sunnyvale, CA (US); Vanco Buca, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/722,606

(22) Filed: Mar. 12, 2010

(65) Prior Publication Data

US 2010/0169567 A1    Jul. 1, 2010

Related U.S. Application Data (63) Continuation of application No. 11/673,730, filed on Feb. 12, 2007, now Pat. No. 7,711,894.

(51) Int. Cl.
*G06F 13/36* (2006.01)
(52) U.S. Cl. ............... 711/112; 711/155; 711/163
(58) Field of Classification Search .............. None
See application file for complete search history.

(56) References Cited

U.S. PATENT DOCUMENTS

| | | | | |
|---|---|---|---|---|
| 6,018,788 A * | 1/2000 | Ichikawa | ........ | 711/113 |
| 6,415,359 B1 * | 7/2002 | Kimura et al. | ........ | 711/137 |
| 6,842,821 B2 | 1/2005 | Nystuen | | |
| 7,159,071 B2 | 1/2007 | Ikeuchi et al. | | |
| 7,711,894 B1 * | 5/2010 | Huang et al. | ........ | 711/112 |
| 2002/0066050 A1 * | 5/2002 | Lerman et al. | ........ | 714/6 |
| 2005/0198433 A1 * | 9/2005 | Kobayashi et al. | ........ | 711/112 |
| 2005/0262317 A1 * | 11/2005 | Nakanishi et al. | ........ | 711/162 |
| 2007/0266218 A1 | 11/2007 | Achiwa | | |

OTHER PUBLICATIONS

Co-pending U.S. Appl. No. 11/673,730, filed Feb. 12, 2007, An-Cheng Huang et al., entitled "Dynamic Disk Throttling in a Wide Area Network Optimization Device".
Bovet, Daniel P. et al., "Understanding the Linux Kernel," Third Edition, *Chapter 15. The Page Cache*, Nov. 1, 2005, 23 pages.
Bovet, Daniel P. et al., "Understanding the Linux Kernel," Third Edition, *Chapter 16, Section 16.1.2. Read-Ahead of Files*, Nov. 1, 2005, 8 pages.
"Adaptive File Readahead," http://lwn.net/Articles/155510/, Oct. 12, 2005, 3 pages.
Iyer, Sitaram et al., "Anticipatory Scheduling: A disk scheduling framework to overcome deceptive idleness in synchronous I/O," Proceedings of the 18th Symposium on Operating Systems Principles, 2001, 14 pages.

(Continued)

*Primary Examiner* — Than Nguyen
(74) *Attorney, Agent, or Firm* — Harrity & Harrity, LLP (57) ABSTRACT

A network device may operate to increase application performance over a wide area network. In one particular implementation, the network device may monitor accesses to a disk drive from entities and determine whether an entity is accessing the disk drive in a manner that causes a disproportionate amount of performance degradation. If so, the network device may throttle access to the disk drive for the entity.

17 Claims, 9 Drawing Sheets

OTHER PUBLICATIONS

Seltzer, Margo et al., "Disk Scheduling Revisited," Proceedings of the 1990 Winter Usenix, Washington, D.C., Jan. 1990, 11 pages.

"An in-depth look at the SCSI environment," http://www.seagate.com/docs/pdf/training/SG_SCSI.pdf, Jul. 12, 2006, 5 pages.

"Tagged Command Queuing," http://en.wikipedia.org/wiki/Tagged_Command_Queuing, Print Date (Feb. 9, 2007) 3 pages.

"Comparing Serial ATA Native Command Queuing (NCQ) and ATA Tagged Command Queuing (TCQ)," http://sata-io.org/docs/NCQ_TCQ_comparison_final.ZIP, Intel Corporation, Oct. 2003, 4 pages.

"Native Command Queuing," http://en.wikipedia.org/wiki/Native_Command_Queuing, Print Date (Feb. 9, 2007) 2 pages.

* cited by examiner

DYNAMIC DISK THROTTLING IN A WIDE AREA NETWORK OPTIMIZATION DEVICE

RELATED APPLICATION

This application is a continuation of U.S. patent application Ser. No. 11/673,730 (now U.S. Pat. No. 7,711,894), filed Feb. 12, 2007, which is incorporated herein by reference.

BACKGROUND OF THE INVENTION

A. Field of the Invention

Concepts described herein relate generally to data caching, and more particularly, to optimizing disk accesses in a wide area network optimization device.

B. Description of Related Art

Geographically distributed entities, such as a business with multiple local offices in different locations, frequently desire to maintain a logically unified proprietary network that is accessible by all of the geographically distributed entities. To accomplish this, a wide area network (WAN) may be used to link the different locations.

Information technology (IT) managers within geographically distributed entities face the conflicting requirements of keeping costs in check while providing users with new and faster applications. This conflict is most acute on the WAN, where costs can be high and getting applications to perform well is hampered by limited bandwidth and high latency.

Solutions are known to help improve performance over the WAN portion of a network. These solutions may be based on a number of technologies, including data compression, data prefetching and caching, application-specific acceleration, and policy-based bandwidth allocation.

Data caching and compression, in particular, can be used to reduce the perceived latency (response time) of data being accessed over a WAN. Compression and caching techniques may be disk-based, as opposed to semiconductor memory based, due to the orders-of-magnitude larger storage capacity of typical hard disk drives. One known problem with disk-based techniques is that a disk access can be relatively slow, particularly if the disk access requires seeking the disk head to the correct location on the disk platter. Therefore, a data caching or compression technique that encounters a lot of "seeky" disk access sequences (i.e., when the compression patterns or cached objects are dispersed over the disk platter) may spend a relatively large amount of time seeking the disk head to the relevant data instead of reading it.

SUMMARY

One aspect is directed to a network device that includes one or more disk drives; logic to monitor access to the one or more disk drives, the disk drive access being associated with entities transferring data through the network device; and logic to determine whether an entity is behaving badly with respect to the access of the one or more disk drives. The network device further includes logic to throttle disk drive access requests for the entity when the entity is determined to be behaving badly.

Another aspect is directed to a device that includes one or more disk drives and a disk-based optimization component. The disk-based optimization component implements network optimization services that increase the perceived performance of a wide area network (WAN), the network optimization services including at least one of a data compression service or a data caching service in which objects used in the data compression service or the data caching service are stored on the one or more disk drives. The device further includes an entity monitoring component configured to monitor disk accesses generated by the disk-based optimization component on behalf of entities using the device and to selectively throttle access to the one or more disk drives to the entities.

Yet another aspect is directed to a method that includes monitoring accesses to a disk drive from a plurality of entities and determining whether an entity is accessing the disk drive in a manner that causes a disproportionate amount of performance degradation for the disk drive relative to accesses to the disk drive from other ones of the entities. The method further includes throttling access to the disk drive for the entity when the entity is determined to access the disk drive in a manner that causes a disproportionate amount of performance degradation.

Yet another aspect is directed to a method that includes monitoring disk drive access for one or more disk drives, the disk drive accesses being associated with entities transferring data through a network device; determining whether an entity is behaving badly with respect to the access of the one or more disk drives; and throttling disk drive access requests for the entity determined to be behaving badly.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a network optimization device may operate to increase application performance over a wide area network. The network optimization device may use disk-based compression and/or caching techniques to achieve the performance increase. The network optimization device may throttle-back or cutoff the compression/caching techniques for entities that are determined to behave badly with respect to disk accesses.

Exemplary System Overview

Figure 1:
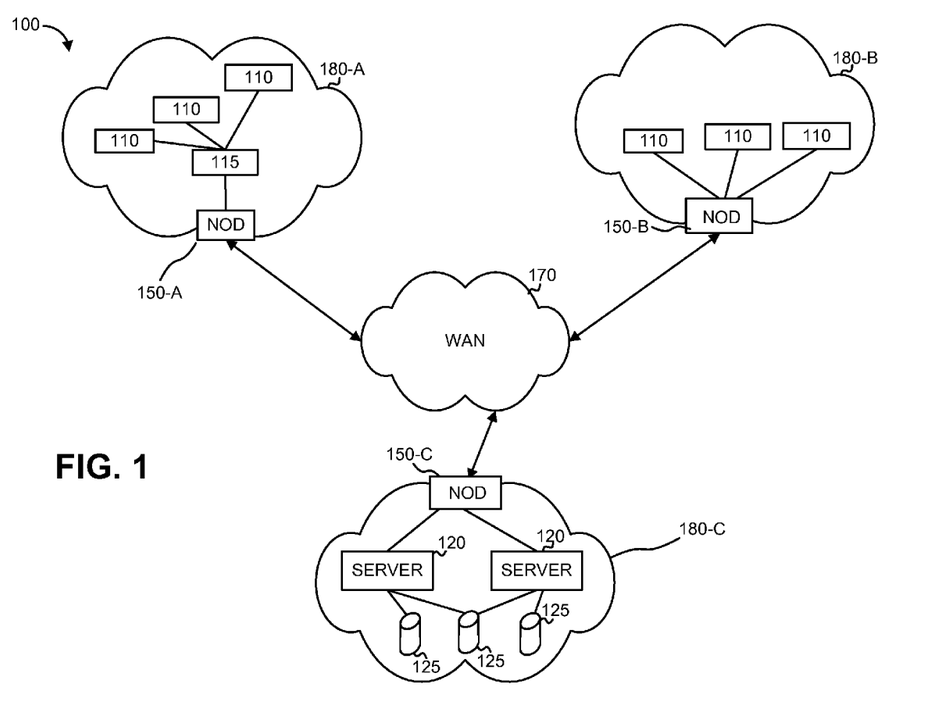
FIG. 1 is a diagram of an exemplary system.

FIG. 1 is a diagram of an exemplary system 100. System 100 may include a wide area network (WAN) 170 and one or more private networks 180-A, 180-B, and 180-C (collectively referred to as private networks 180). Private networks 180 may be geographically dispersed and different ones of private networks 180 may wish to communicate with one another over WAN 170. Private networks 180 may each, for example, be a local area network (LAN) for a branch office associated with a corporation or other entity. As another example, private networks 180-A and 180-B may be LANs for a corporate branch office and private network 180-C may be a data center for the corporation.

WAN 170 may include a public network, such as the Internet. In some implementations, WAN 170 may be implemented by privately owned or leased data lines between private networks 180, or by a combination of a public network and privately owned or leased data lines. In general, data traffic between private networks 180 through WAN 170 may be characterized by one or more of increased cost, higher latency, or lower bandwidth than data traffic within a single corporate network 180. Accordingly, network applications accessing resources between private networks 180 and across WAN 170 may tend to run less optimally than an application running locally at a private network 180.

Private networks 180 may each include a number of computing devices, such as, for example, client computing stations 110, network security device(s) 115, servers 120, and databases 125. Client computing stations 110 may include computing devices of end-users, such as desktop computers or laptops. Network security devices 115 may include, for example, firewalls or other devices relating to network security. Servers 120 may include one or more devices designed to interact with and deliver information to other devices, such as client computing stations 110. Servers 120 may, for example, serve data files or network applications to computing stations 110 over WAN 170. Servers 120 may interact with databases 125 when providing information to client computing stations 110.

In the exemplary system shown in FIG. 1, private networks 180-A and 180-B may be branch offices that include a number of client computing stations 110 and private network 180-C may function as a data center that includes a number of servers 120, which may include file servers for private networks 180-A and 180-B. One of ordinary skill in the art will recognize that the number of private networks shown in FIG. 1 (three), the elements associated with each private network and/or the functionality of each private network is exemplary.

Private networks may be associated with network optimization devices (NODs) 150-A through 150-C (collectively referred to as network optimization devices 150). As shown in FIG. 1, for example, each of private networks 180-A through 180-C is associated with a corresponding network optimization device 150-A, 150-B, and 150-C, respectively. Network optimization devices 150 may generally operate to enhance the performance of applications running over WAN 170 between various ones of private networks 180. For example, assume that a user at one of client computing stations 110 at private network 180-A would like to retrieve a file from a file server at private network 180-C. In this situation, network optimization devices 150-A and 150-C may operate to decrease the perceived latency and/or increase the perceived bandwidth of WAN 170 by providing, for example, data compression and data caching services over WAN 170. Aspects of network optimization devices 150 as they relate to disk-based data compression and caching will be particularly described in more detail herein.

Exemplary Device Architecture

Figure 2:
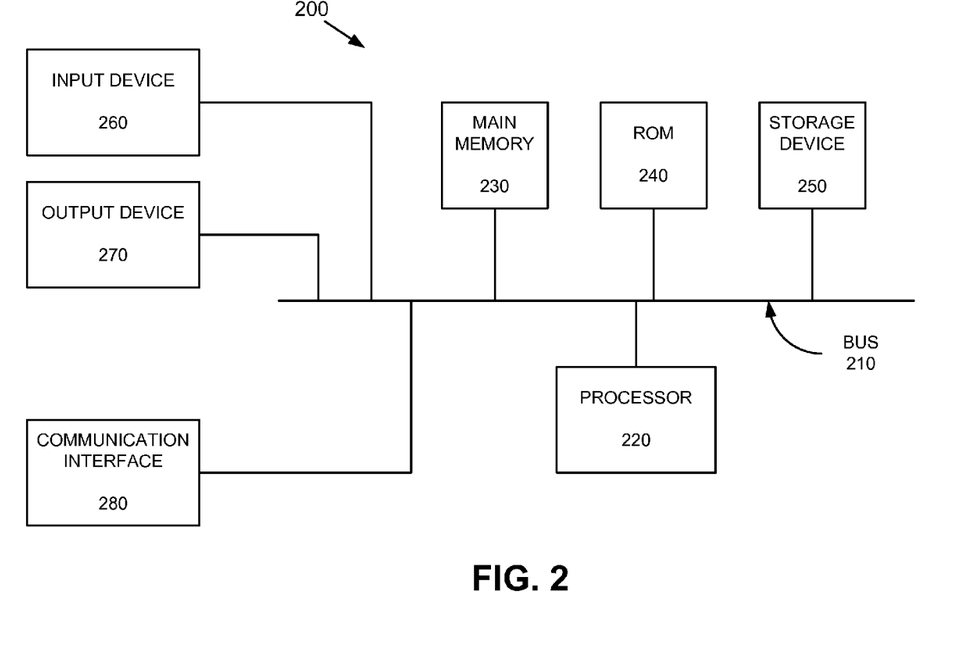
FIG. 2 is a block diagram of an exemplary device shown in FIG. 1.

FIG. 2 is a block diagram of an exemplary device 200, which may correspond to one or more of client computing stations 110, network security device 115, a server 120, a database 125, or a network optimization device 150. Device 200 may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic storage medium such as a hard disk drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

Device 200 may perform certain operations, as described in detail below. The device may perform these operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Disk-Based Compression/Caching Operations

Before describing the operation of network optimization devices 150 in additional detail, it will be helpful to generally describe compression and caching services over a wide area network.

Figure 3A:
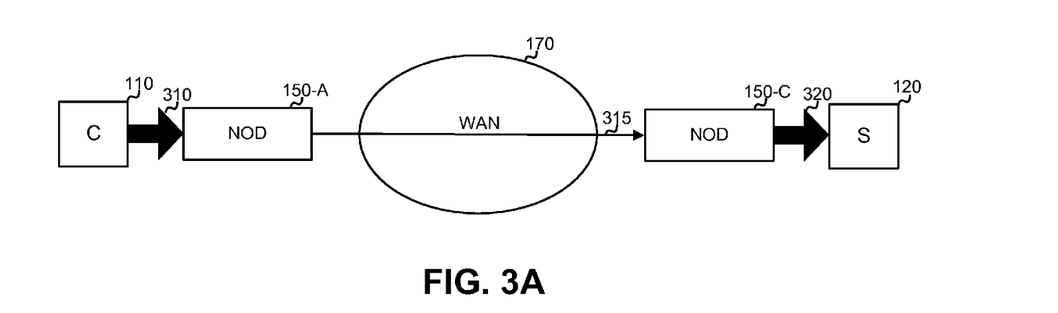
FIG. 3A is a diagram illustrating data compression over a WAN.

FIG. 3A is a diagram illustrating data compression over a WAN to improve perceived application performance over the WAN. The data may be, for example, file data being transferred to a remote server, such as a file being transferred by a client computing station 110 to a file server 120.

Assume that client computing station 110, in private network 180-A, would like to transfer a file or a portion of a file to file server 120, in private network 180-C. The file transfer is being made across WAN 170. Network optimization devices 150-A and 150-C may operate to increase the perceived performance of file transfers for client computing station 110 by, among other things, using data compression when transferring data over WAN 170.

One form of data compression is known as symbol or dictionary based compression. With this form of data compression, pairs of network optimization devices may store patterns of data, such as patterns from previously exchanged data, as symbols in memory or on a hard disk drive. Each symbol may be associated with an identifier, such as a symbol index number. Each symbol should ideally be longer or much longer than the corresponding identifier. When a symbol is subsequently encountered, only the identifier is sent instead of the symbol.

As an example of the operation of data compression for transmitted data, assume that client computing station 110 initiates transmission of data to file server 120, shown as arrow 310 in FIG. 3A. Network optimization device 150-A may examine the data to either store new symbols or look for previously stored symbols. If network optimization device 150-A locates a previously stored symbol that is also stored at network optimization device 150-C, network optimization device 150-A may transmit the identifier for the symbol instead of the symbol to network optimization device 150-C (shown as arrow 315). Network optimization device 150-C may receive the identifier and substitute the correct symbol into the data stream before transmitting the data stream to file server 120 (shown as arrow 320). In this manner, the actual data sent over WAN 170 is compressed relative to the original stream sent by client computing station 110 to file server 120.

Figure 3B:
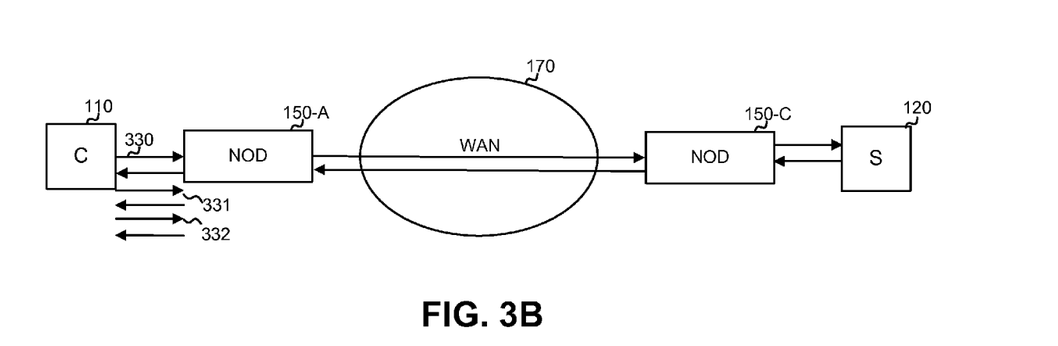
FIG. 3B is a diagram illustrating data caching over a WAN.

FIG. 3B is a diagram illustrating data caching to improve perceived performance of the WAN. Assume that file data is being requested by client computing station 110 from file server 120. Network optimization device 150-A may keep a cache of the responses to previous data requests from client 110 (and possibly from other client computing stations). When a request for data generates a cache hit, network optimization device 150-A may return the data directly from the cache without ever sending a request to file server 120 or network optimization device 150-C.

As an example of the operation of a cache, assume that client computing station 110 issues data requests 330, 331, and 332. The data corresponding to request 330 is not in the cache in network optimization device 150-A. Accordingly, the request is transmitted over WAN 170 to file server 120. Assume, however, that network optimization device 150-A is able to respond to requests 331 and 332 from its local cache. In this situation, no request needs to be sent over WAN 170, and instead, network optimization device 150-A may directly transmit the requested data to client computing station 110. In this manner, certain data requests and responses that would normally need to traverse WAN 170 will not need to traverse the WAN.

In performing compression and caching operations, network optimization devices 150 may implement the cache and/or symbol dictionary in memory, such as main memory 230. Large memories allow a more extensive, and thus a potentially more effective, caching and/or compression scheme. With respect to compression, a larger memory may allow for a larger dictionary. With respect to caching, a larger memory may allow for more or larger objects to be cached. Relative to semiconductor-based memory, hard disk drives tend to make available more storage per unit of cost, and accordingly, it may be desirable to use a hard disk drive based cache or symbol dictionary.

Figure 4A:
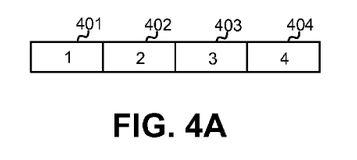
FIGS. 4A and 4B are diagrams illustrating exemplary data blocks for exemplary disk accesses.
Figure 4B:
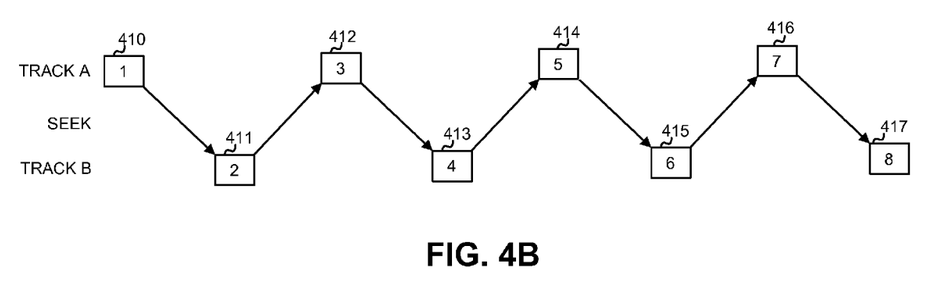

One factor that affects performance of a hard disk drive relates to how much time the disk head spends seeking to the desired data. The seek time of a disk head can be defined as the amount of time required for the read/write head of the disk to move between tracks over the surfaces of the disk platters. Typically, the amount of time required to seek the disk head to a particular data block may be an order of magnitude higher than the amount of time required to actually read the data block. FIGS. 4A and 4B are diagrams conceptually illustrating access time for data stored in a hard disk drive. FIG. 4A is a diagram illustrating four data blocks, data blocks 401 through 404, in which successive data blocks are physically near one another (e.g., consecutively stored on the same track in the disk drive). Therefore, the time required to read these four data blocks is the total time of one seek operation and four read operations performed by the disk drive. FIG. 4B is a diagram illustrating eight data blocks, data blocks 410 through 417, in which successive data blocks are physically separated from one another (e.g., on different tracks in the disk drive). Assume that each data block in FIG. 4B is half the size of each data block in FIG. 4A, resulting in the same amount of data read at the end of the operations shown in FIG. 4A and FIG. 4B. In FIG. 4B, between reading successive data blocks, the drive head will spend additional time seeking to the next data block. Therefore, reading the entire set of data in FIG. 4B requires eight seek operations and eight read operations. Since a seek operation can be much more expensive than a read operation, the "seeky" data access pattern shown in FIG. 4B is significantly less efficient than the sequential data access pattern shown in FIG. 4A.

Many different "entities" may be transferring data through NODs 150 at any given time. Different entities may refer to, for example, different client computers, users, applications, hosts, or subnets. Because a disk seek operation can require much longer time to complete than a read operation, one "bad" entity that tends to access the disk drive in a manner that is highly "seeky" (such as the disk access shown in FIG. 4B) can degrade the performance of the disk drive for all of the other entities.

Dynamic Disk Throttling

As previously mentioned, a network optimization device 150 may dynamically throttle-back or cutoff disk based compression or caching operations for entities that are determined to behave badly with respect to the disk accesses. This dynamic disk throttling will now be further described with reference to FIGS. 5-9.

Figure 5:
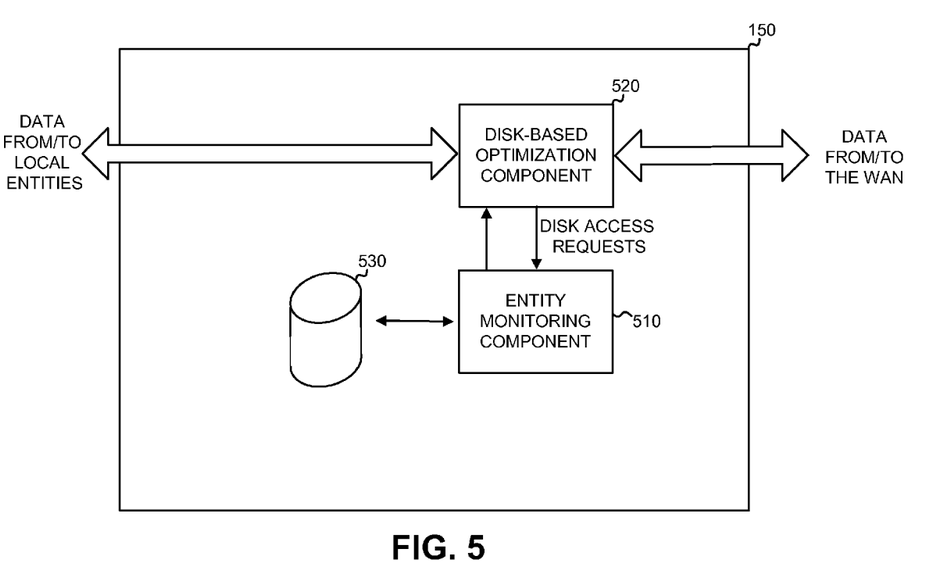
FIG. 5 is a diagram conceptually illustrating exemplary elements of a network optimization device.

FIG. 5 is a diagram conceptually illustrating exemplary elements of one of network optimization devices 150. Network optimization device 150 may include entity monitoring component 510, disk-based optimization component 520, and hard disk drive 530.

Entity monitoring component 510 may monitor disk access requests associated with entities transferring data through network optimization device 150. An entity, as used herein, may refer to any distinguishable unit that uses network optimization device 150. As a result of the monitoring, entity monitoring component 510 may determine that certain entities are behaving badly and should have disk accesses throttled.

Disk-based optimization component 520 may implement network optimization techniques over WAN 170 for the entities accessing network optimization device 150. In particular, disk-based optimization component 520 may implement one or both of compression or cache services to attempt to enhance the perceived performance of network 170. Although shown as a single component in FIG. 5, it can be appreciated that disk-based optimization component 520 may be implemented using one or more physical or logical elements. For example, disk-based optimization component 520 may include independently implemented compression and cache services.

A hard disk drive 530 may be used by disk-based optimization component 520 in implementing the compression or caching services. In one implementation, hard drive 530 may be implemented as a single hard disk drive. In alternate implementations, hard drive 530 may be a logical drive implemented as an aggregation or cluster of multiple hard disk drives. Disk access requests generated on behalf of an entity by disk-based optimization component 520 may be forwarded through entity monitoring component 510 to hard drive 530.

Figure 6:
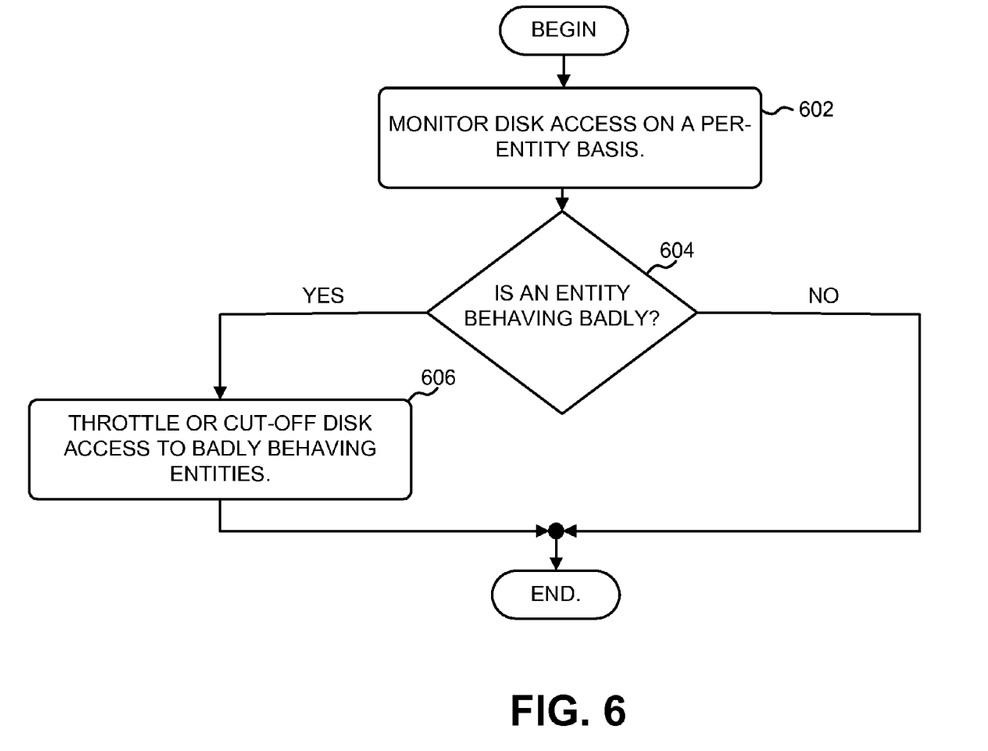
FIG. 6 is a flow chart illustrating exemplary operations for performing dynamic disk throttling.

FIG. 6 is a flow chart illustrating exemplary operations for performing dynamic disk throttling. Entity monitoring component 510 may monitor disk accesses from disk-based optimization component 520 on a per-entity basis (act 602). In other words, entity monitoring component 510 may keep track of each entity (or a subset of the available entities) that causes disk-based optimization component 520 to issue disk access requests on behalf of entities. In one implementation, entity monitoring component 510 may monitor the entities to quantify the "seekiness" of the disk accesses caused by the entities.

Based on the monitoring determined in act 602, entity monitoring component 510 may determine whether a particular entity is behaving badly (act 604). For example, an entity that creates a lot of seeky disk accesses may be determined to be behaving badly. Subsequent disk accesses associated with badly behaving entities may be throttled (reduced) or cut-off (act 606). In this manner, an entity, such as an application, that causes a disproportionate amount of performance degradation for hard disk drive 530 may be restricted from accessing hard disk drive 530. Ideally, this will free up disk bandwidth for entities that access hard disk drive 530 more efficiently, and may result in an increase in the total performance from hard disk drive 530, and thus an increase in total network performance for these entities over WAN 170 due to caching and/or compression services provided by disk-based optimization component 520.

It is worth noting that entities that have their disk accesses throttled will still function normally. That is, because hard disk drive 530 is used to enable optimization over WAN 170, reducing accesses to hard disk drive 530 to an entity may only tend to reduce the potential performance increase offered by the network optimization device but should not affect the functionality of the entity. The entity may lose some potential performance optimization opportunities, but the end-to-end result should will still be correct.

One particular technique for implementing the operations shown in FIG. 6 will now be described in more detail. In this implementation, whether an entity is behaving "badly" (FIG. 6, act 604) may be determined using a metric that measures the total time spent on disk accesses within a sampling period.

Figure 7:
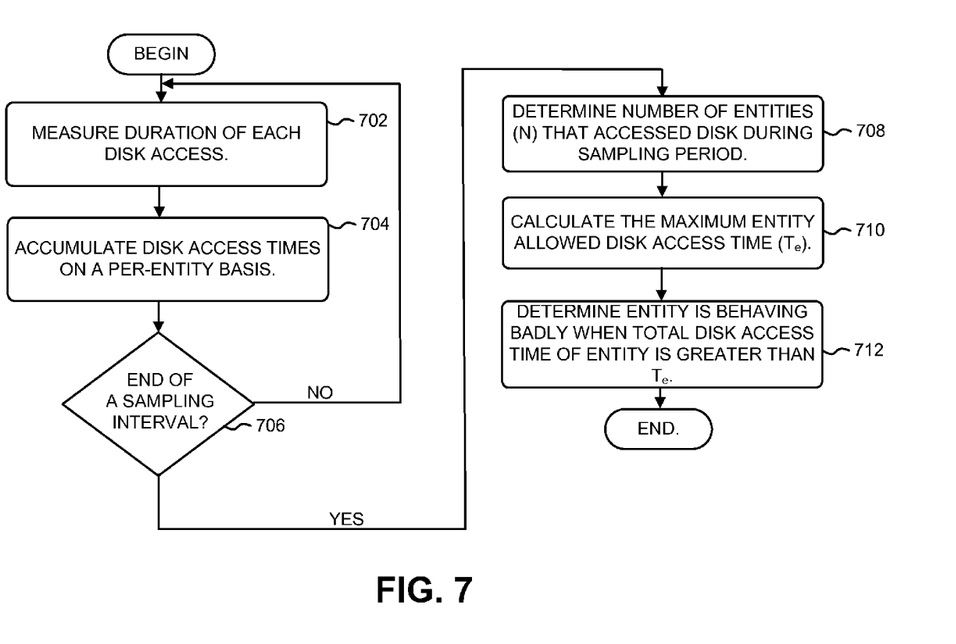
FIG. 7 is a flow chart illustrating exemplary operations for dynamic disk throttling based on a metric that measures the total time spent on disk accesses within a sampling period.

FIG. 7 is a flow chart illustrating exemplary operations for dynamic disk throttling based on a metric that measures the total time spent on disk accesses within a sampling period. For this implementation, the following variables are defined:

$T_s$=the sampling period,
$T_{max}$=maximum disk access time within each sampling period,
N=the number of active entities in a sampling period, and
$T_e$=the maximum allowed disk access time per active entity ($T_e = T_{max}/N$).

Entity monitoring component 510 may measure the duration of each disk access to hard disk drive 530 (act 702). The entity associated with each disk access (i.e., the entity on which behalf the disk access is made) is also monitored. The total disk access time may be accumulated on a per-entity basis (act 704). In one implementation, entity monitoring component 510 may maintain a physical or logical counter for each entity. Each counter may be used to accumulate the total disk access time for an entity within a sampling period. Each time a disk access occurs, the duration of the disk access may be added to the counter of the corresponding entity.

Figure 8:
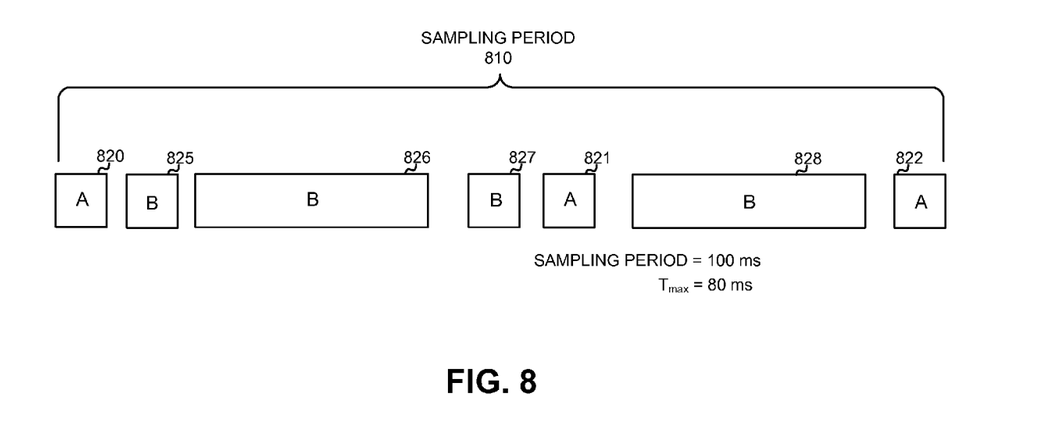
FIG. 8 is a diagram conceptually illustrating disk accesses for a number of entities.

FIG. 8 is a diagram conceptually illustrating disk accesses for a number of entities. In this example, assume that two entities access disk drive 530 during a sampling period 810. Entity "A" accesses disk drive 530 three times during the sampling at disk accesses 820, 821, and 822. Assume that each of disk accesses 820 through 822 is 5 milliseconds (ms) long. Entity "B" accesses disk drive 530 four times during the sampling at disk accesses 825, 826, 827, and 828. Assume that each of disk accesses 825 and 827 are 5 ms long and disk accesses 826 and 828 are each 25 ms long. In this example, entity monitoring component 510 may accumulate, in acts 702 and 704, the total disk access time of entity A as 15 ms (5 ms+5 ms+5 ms) and the total disk access time of entity B as 60 ms (5 ms+25 ms+5 ms+25 ms).

Entity monitoring component 510 may continue to accumulate disk access times until the end of the sampling interval (act 706). At the end of each sampling interval, entity monitoring component 510 may determine, in acts 708-712 (discussed below), whether an entity is behaving badly.

The number of entities (N) that accessed disk drive 530 may be calculated (act 708). For example, in the implementation in which entity monitoring component 510 maintains a counter corresponding to each entity, N is equal to the number of non-zero counters. Based on N, the maximum allowed disk access time per active entity, $T_e$, may be calculated (act 710). $T_e$ may be calculated as $T_{max}/N$, where $T_{max}$ is the maximum allowed disk access time within each sampling period. $T_{max}$ may be less than the sampling period and in one implementation may be predetermined based on empirical observation. In an alternate implementation, $T_{max}$ may be dynamically and periodically or occasionally adjusted by entity monitoring component 510. In general, $T_{max}$ may be chosen with the goal of optimizing the cache or compression services by limiting disk accesses to no more than $T_{max}$ per sampling interval. In the example of FIG. 8, assume that the sampling period is 100 ms and $T_{max}$ is chosen as 80 ms.

An entity may be determined to be behaving badly when the total disk access time of the entity is greater than $T_e$ (act 712). In other words, $T_e$ may be used as a threshold to determine when an entity is behaving badly. Entity monitoring component 510 may compare, for each entity, the total disk access time of the entity to $T_e$. For example, in one implementation in which each entity is associated with a counter, entity monitoring component 510 may compare the counter value of each entity to $T_e$.

Referring to the example of FIG. 8, in which N equals two and $T_{max}$ is 80 ms, $T_e$ is 40 ms (80 ms divided by 2). Entity A has a total disk access time of 15 ms and is thus a "good" entity, i.e., entity A will not be determined to be behaving badly. Entity B, however, has a total disk access time of 60 ms, which is greater than 40 ms, and accordingly, entity B is a "bad" entity.

Instead of using the total disk access time per sampling period as a metric of determining whether an entity is behaving badly, it can be appreciated that other metrics may be used. For example, the number of disk accesses per sampling period may be used as an alternate metric.

The operations described above with respect to FIG. 7 for performing dynamic disk throttling were described as classifying an entity as behaving badly based on a metric (total time per-entity spent on disk accesses) calculated in a single sampling period. In an alternate implementation, historical values of the metric from previous sampling periods may also be taken into consideration. Taking historical metric values into account may provide for a more robust application that can better handle transient behavior, such as an entity that has a transient spike in disk access during a sampling period but resumes normal behavior in the next sampling period.

In one implementation, historical values of the metric from previous sampling periods are taken into consideration based on an average value of a number of historical metrics. For example, an exponential weighted moving average (EWMA) may be used to calculate the historical value. An EWMA may be defined as:

$$m' = m \cdot w + c(1-w),\qquad \text{Equation (1)}$$

where m' is the new EWMA value, m is the previous EWMA value, w is the weight, and c is the current value of the metric (e.g., the total disk access time for the entity in the latest sampling period). The weight, w, may be selected as a constant value between zero and one that defines how quickly the current value of the metric changes the EWMA. For example, when w is zero the EWMA equals the current value of the metric. As w is increased towards one the current value of the metric is given less weight and the EWMA is more heavily biased towards historical values. The weight, w, may be selected as, for example, 0.5. The EWMA effectively smoothes the measurement of the metric so that a transient spike will tend to not cause the EWMA to go above the maximum value. Instead, it may require that a number of consecutive measurements be "bad" before the EWMA crosses the threshold.

Figure 9:
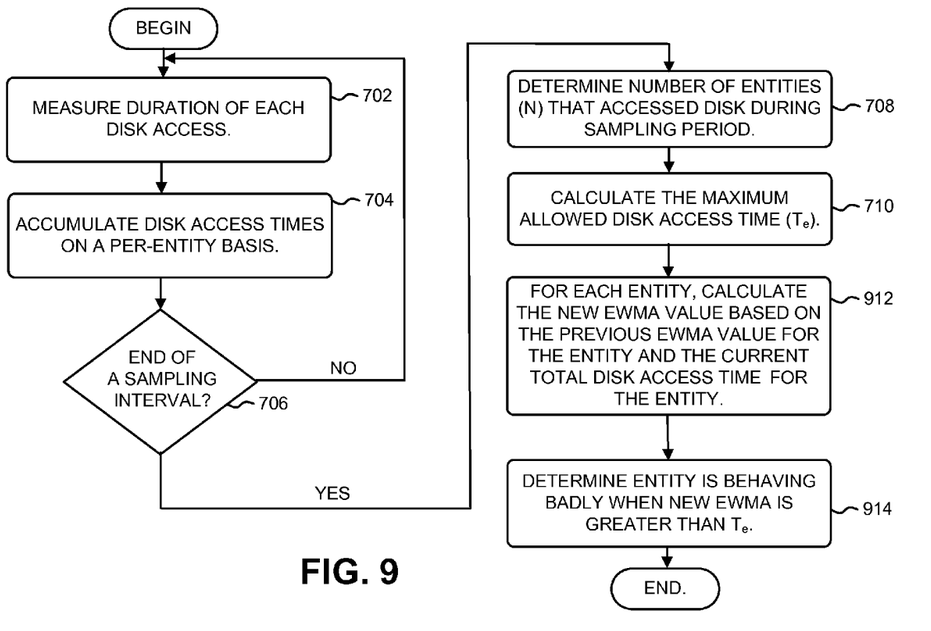
FIG. 9 is a flow chart illustrating exemplary operations for dynamic disk throttling based on a metric that measures the total time spent on disk accesses within a sampling period.

FIG. 9 is a flow chart illustrating exemplary operations for dynamic disk throttling based on a metric that measures the total time spent on disk accesses within a sampling period when using the EWMA. The operations of FIG. 9 may be performed for each sampling interval.

Acts 702-710, as shown in FIG. 9, are identical to the corresponding acts shown in FIG. 7 and thus will not be described again. In act 912 the new EWMA value may be calculated, using equation (1), for each active entity based on the previous EWMA for the entity and the measured total disk access time for the entity. An entity may then be determined to be behaving badly when the new EWMA for the entity is greater than $T_e$ (act 914).

As previously mentioned, an entity determined to be behaving badly (act 712 or 914) may be throttled or cut-off from making disk accesses (act 606, FIG. 6). A number of different throttling mechanisms may be used. In one implementation, entities may have their disk accesses throttled based on the following two parameters:

$D_t$=the throttling duration, and
$P_t$=the throttling probability.

$D_t$ may correspond to the amount of time to throttle an entity marked as "bad." $P_t$ may correspond to the probability that a disk access will be rejected during $D_t$. The throttling mechanism based on $D_t$ and $P_t$ may function by probabilistically rejecting disk accesses from entities determined to be badly behaving for the time interval $D_t$ that begins when the entity is determined to be badly behaving. Setting $P_t$ to one corresponds to a complete cut-off of disk accesses by the badly behaving entity. Lower values of $P_t$ may allow some of the disk accesses by the badly behaving entity to be accepted. When $P_t$ is less than one, entity monitoring component 510 may generate a random number or pseudo-random number between zero and one and compare this number to $P_t$ for each disk access by the badly behaving entity. If the random number is greater than $P_t$, the disk access may be accepted and otherwise it may be rejected.

The above-described throttling mechanism allows an entity that is being throttled to complete some of its disk accesses so that it can still obtain some benefit from disk-based compression/caching. Additionally, an entity may only be throttled for the duration of $D_t$ so that if the entity resumes normal behavior during that time, it will be allowed to access the disk normally after $D_t$ ends.

In one implementation, $D_t$ and $P_t$ may be predetermined based on, for example, empirical observation. In an alternate implementation, $D_t$ and $P_t$ may be dynamically and periodically or occasionally adjusted by entity monitoring component 510.

In the discussion above, an entity was defined based on a number of different possible categorizations, such as by application, network subnet, user, etc. In one implementation, different types of entity categorizations may be simultaneously supported. For example, a separate set of per-entity counters can be maintained for each type of categorization (e.g., one set of per-application counters, one set of per-subnet counters, etc.). This may allow the dynamic throttling to detect when any of these entities start behaving badly and to throttle disk access accordingly.

CONCLUSION

A dynamic disk access throttling technique was described for optimizing the performance of disk-based WAN optimization services. One advantage of the techniques described herein is that entities that generate inefficient disk access requests, and which may thus tend to reduce the performance of other entities using the WAN optimization services, are given reduced optimization preference but yet are still able to function normally. Therefore, the overall performance of the WAN optimization services may be improved.

While a series of acts have been described with regard to FIGS. 6, 7, and 9, the order of the acts may be varied in other implementations consistent with the invention. Moreover, non-dependent acts may be implemented in parallel.

It will also be apparent to one of ordinary skill in the art that aspects described herein may be implemented in many different forms of network topologies, software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
one or more disk drives;
logic to monitor access to the one or more disk drives by an entity that transfers data through the network device;
logic to detect occurrence of a condition with respect to the access, by the entity, of the one or more disk drives, where the logic to detect the occurrence of the condition includes:
logic to detect when a total disk access time by the entity exceeds a predetermined threshold;
logic to throttle disk drive access requests by the entity when the occurrence of the condition is detected; and
logic to cease throttling disk drive access requests by the entity after a first time period elapses from when the occurrence of the condition is detected.

2. The network device of claim 1, where the logic to detect when the total disk access time by the entity exceeds the predetermined threshold includes:
logic to determine a disk access time, for each of a plurality of sampling periods, by the entity.

3. The network device of claim 1, where the logic to throttle disk drive access requests further includes:
logic to cut off disk drive access requests by the entity.

4. The network device of claim 1, where the entity includes one or more of a client computer, an application, a host, or a network subnet.

5. A network device comprising:
one or more disk drives;
logic to monitor access to the one or more disk drives by an entity that transfers data through the network device;
logic to detect occurrence of a condition with respect to the access, by the entity, of the one or more disk drives, where the logic to detect the occurrence of the condition includes:
logic to calculate a metric of disk access by the entity, and
logic to compare the metric to a threshold in order to detect the occurrence of the condition;
logic to throttle disk drive access requests by the entity when the occurrence of the condition is detected; and
logic to cease throttling disk drive access requests by the entity after a first time period elapses from when the occurrence of the condition is detected.

6. The network device of claim 5, where the metric is based on an average of a plurality of previous metrics.

7. The network device of claim 6, where the metric is calculated as an exponential weighted moving average of the plurality of previous metrics.

8. A method comprising:
monitoring, by a device, access to one or more disk drives, associated with a network device, by an entity that transfers data through the network device;
detecting, by the device, an occurrence of a condition with respect to the access, by the entity, of the one or more disk drives, where detecting the occurrence of the condition includes:
calculating a metric of disk access by the entity, and
comparing the calculated metric of disk access to a threshold in order to determine whether the condition has occurred;
throttling, by the device, disk drive access requests from the entity when the occurrence of the condition is detected; and
ceasing throttling, by the device, disk drive access requests from the entity after a first time period elapses from when the occurrence of the condition is detected.

9. The method of claim 8, where the device includes the network device.

10. The method of claim 8, where the metric is based on an average of a plurality of previous metrics for the entity.

11. The method of claim 10, where the average of the plurality of previous metrics includes an exponential weighted moving average.

12. The method of claim 8, where the entity includes one or more of a client computer, an application, a host, or a network subnet.

13. A method comprising:
monitoring, by a device, access to one or more disk drives, associated with a network device, by an entity that transfers data through the network device;
detecting, by the device, an occurrence of a condition with respect to the access, by the entity, of the one or more disk drives, where the detecting the occurrence of the condition includes:
detecting when a total disk access time by the entity exceeds a predetermined threshold;
throttling, by the device, disk drive access requests from the entity when the occurrence of the condition is detected; and
ceasing throttling, by the device, disk drive access requests from the entity after a first time period elapses from when the occurrence of the condition is detected.

14. The method of claim 13, where the detecting when the total disk access time by the entity exceeds the predetermined threshold includes:
determining a disk access time, for each of a plurality of sampling periods, by the entity.

15. The method of claim 13, where the throttling disk drive access requests includes:
cutting off disk drive access requests for the entity.

16. A method comprising:
monitoring, by a device, access to one or more disk drives, associated with a network device, by an entity;
detecting, by the device, an occurrence of a condition with respect to the access, by the entity, of the one or more disk drives, where the detecting the occurrence of the condition includes:
detecting when a total disk access time by the entity exceeds a predetermined threshold; and
cutting off, by the device and in response to detecting the occurrence of the condition, disk drive access requests by the entity for a predetermined duration of time.

17. The method of claim 16, further comprising:
allowing disk drive access requests by the entity after the predetermined duration of time expires.

* * * * *